United States Patent
Park

(10) Patent No.: US 12,187,212 B2
(45) Date of Patent: Jan. 7, 2025

(54) SYSTEM METHOD FOR DETERMINING COLLISION OF WALKER

(71) Applicant: HYUNDAI MOBIS CO., LTD., Seoul (KR)

(72) Inventor: Byung Hyuk Park, Anyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 205 days.

(21) Appl. No.: 17/500,862

(22) Filed: Oct. 13, 2021

(65) Prior Publication Data
US 2022/0144199 A1    May 12, 2022

(30) Foreign Application Priority Data

Nov. 11, 2020  (KR) .................... 10-2020-0150273
Nov. 11, 2020  (KR) .................... 10-2020-0150274

(51) Int. Cl.
| | | |
|---|---|---|
| *B60R 21/0136* | (2006.01) | |
| *B60R 21/01* | (2006.01) | |
| *B60R 21/0132* | (2006.01) | |
| *B60R 21/36* | (2011.01) | |
| *B60R 21/38* | (2011.01) | |

(Continued)

(52) U.S. Cl.
CPC .... *B60R 21/0136* (2013.01); *B60R 21/01332* (2014.12); *B60R 21/36* (2013.01); *B60R 21/38* (2013.01); *G06V 20/56* (2022.01); *G06V 40/10* (2022.01); *H04N 5/33* (2013.01); *B60R 2021/01013* (2013.01)

(58) Field of Classification Search
CPC .......... B60R 21/0136; B60R 21/01332; B60R 21/36; B60R 21/38; B60R 2021/01013; G06V 40/10; G06V 20/58
See application file for complete search history.

(56) References Cited

U.S. PATENT DOCUMENTS

2013/0235202 A1*  9/2013  Nagaoka .................. H04N 5/33
                                                     348/148
2014/0195070 A1*  7/2014  Shimizu .............. B60W 30/095
                                                     701/1

(Continued)

FOREIGN PATENT DOCUMENTS

| DE | 112016002149 B4 * | 10/2020 | ............. B60R 19/18 |
|---|---|---|---|
| KR | 10-2008-0101483 | 11/2008 | |
| KR | 10-0930224 | 12/2009 | |

OTHER PUBLICATIONS

Kretschmar, Mark, "Capacitive Sensor Operation Part1: The Basics", May 1, 2009, (Year: 2009).*

*Primary Examiner* — James M McPherson
*Assistant Examiner* — Clint Pham
(74) *Attorney, Agent, or Firm* — DLA PIPER LLP (US)

(57) ABSTRACT

Disclosed is a pedestrian collision determination system including a collision detection sensor and a control unit, the collision detection sensor including a conductive pattern disposed on a front surface of a shock absorber of a vehicle bumper to form an electromagnetic field by an application of alternating current power and a conductive material disposed at a position facing the conductive pattern on an inner surface of a bumper skin of the vehicle bumper, and the control unit determining an occurrence or non-occurrence of a collision of a pedestrian based on a change of a current flowing in the conductive pattern.

15 Claims, 11 Drawing Sheets

(51) Int. Cl.
*G06V 20/56* (2022.01)
*G06V 40/10* (2022.01)
*H04N 5/33* (2023.01)

(56) References Cited

U.S. PATENT DOCUMENTS

| | | | |
|---|---|---|---|
| 2015/0175120 A1* | 6/2015 | Gaas | B60R 21/01 701/45 |
| 2015/0224956 A1* | 8/2015 | Takenaka | B60R 21/38 73/862.381 |
| 2015/0274109 A1* | 10/2015 | Narita | B60R 19/483 293/102 |
| 2017/0232918 A1* | 8/2017 | Sancricca | B60R 21/013 701/45 |
| 2018/0105131 A1* | 4/2018 | Freienstein | B60R 21/0136 |

* cited by examiner

ELECTROMAGNETIC
FIELD FORMATION

SYSTEM METHOD FOR DETERMINING COLLISION OF WALKER

CROSS REFERENCE TO RELATED APPLICATION

The present application claims priority to Korean Patent Application No. 10-2020-0150274, filed Nov. 11, 2020 and to Korean Patent Application No. 10-2020-0150273, filed Nov. 11, 2020, the entire contents of which is incorporated herein for all purposes by this reference.

BACKGROUND OF THE INVENTION

Field of the Invention

The present invention relates to pedestrian collision determination system and method, and more specifically, to a pedestrian collision determination system and method capable of accurately determining an occurrence or non-occurrence of a pedestrian collision through a sensor with a simple structure that may sense the occurrence or non-occurrence of the pedestrian collision at the time of a collision between a vehicle and a pedestrian.

Description of the Related Art

Interest in the safety of pedestrians colliding without any protective gear as well as the safety of a driver who operates the vehicle is increasing in recent years.

The pedestrian collision safety laws and regulations of Korea stipulate head injury criteria in the event of a secondary collision in which the head of the pedestrian collides with the vehicle hood following the primary collision between the vehicle and the pedestrian, and different structural collision characteristics are required for each head model.

The most important aspect of these collision characteristics is that the vehicles should be structured such that the head injury meets the head injury criteria (HIC) with the injury index being uniformly equal to 1000 or less over the entire area of model heads and the engine compartments should be packaged so as to minimize the maximum deformation in the event of the collision.

Accordingly, a shock-absorbing function for neutralizing a pedestrian collision, together with the design aspect for the exterior elegance as well as the stiffness primarily required of the vehicle, is being considered in designing the vehicle hood.

On the other hand, as the automotive industry advances, various convenience features are being developed. In particular, to protect a colliding pedestrian at the time of an accident such as a collision and the like and comply with the collision safety laws as described above, a pedestrian protection system that determines the colliding object to be a pedestrian and, accordingly, lifts the vehicle hood or deploy an airbag for the pedestrian at the time of a collision between a vehicle and a pedestrian is being employed in the vehicles.

The conventional pedestrian protection system is implemented in a manner of directly fastening passive sensors such as an acceleration sensor, a pressure sensor, an optical fiber sensor, and the like to the rear surface of a bumper skin of a vehicle in order to detect a pedestrian collision. Such a conventional pedestrian protection system needs to install the passive sensor devices over the entire bumper, requiring a very large number of sensors, and each sensor must be individually mounted on the bumper.

Accordingly, the conventional pedestrian protection system has problems such as increased costs, an increased burden of assembly man-hours, and the like as the number of separate components and sensors for sensor installation increases.

The matters described above as the technical background are intended only for a better understanding of the background of the present invention and should not be taken as an acknowledgment that they pertain to the conventional art already known to those skilled in the art.

SUMMARY OF THE INVENTION

A technical object of the present invention is to provide a pedestrian collision determination system and method equipped with pedestrian collision sensors that have a simple structure and are easy to assemble.

As a means of achieving the technical object, the present invention provides a pedestrian collision determination system including a collision detection sensor including a conductive pattern disposed on a front surface of a shock absorber of a vehicle bumper to form an electromagnetic field by an application of alternating current power and a conductive material disposed at a position facing the conductive pattern on an inner surface of a bumper skin of the vehicle bumper; and a control unit determining an occurrence or non-occurrence of a pedestrian collision based on a change in the current flowing through the conductive pattern.

The conductive pattern may have a radiating pattern of an antenna in an embodiment of the present invention.

The current flowing in the conductive pattern may change when a bumper skin deformation generated by a pedestrian collision causes the conductive material to penetrate a region of an electromagnetic field formed by the conductive pattern in an embodiment of the present invention.

In an embodiment of the present invention, the peak value of the current flowing in the conductive pattern may vibrate according to the frequency of the bumper skin vibration generated by the pedestrian collision.

In an embodiment of the present invention, the control unit may determine the mass and stiffness of a colliding object based on the magnitude of the peak value of the current flowing in the conductive pattern and the vibration frequency of the peak value of the current and, based on the determination result, determine whether the colliding object is a pedestrian.

An embodiment of the present invention may further include a front object detection unit detecting an object in front of the vehicle and a protection module driving unit driving a protection module for protecting the pedestrian at the time of the collision with the vehicle.

The front object detection unit may include an infrared thermal imaging camera, and the control unit may determine the front object to be a protection device operation target when an integral value obtained by integrating the infrared intensity of the front object inputted from the infrared thermal imaging camera and compensated for the outside temperature is equal to or higher than a set intensity.

As another means of achieving the technical object described above, the present invention provides a pedestrian collision determination method including a step of determining the mass and stiffness of the colliding object based on the magnitude of the peak value of the current flowing in the conductive pattern and the vibration frequency of the peak value of the current and, based on the determination result, determining whether the colliding object is a pedestrian, using a collision detection sensor including a conductive pattern disposed on a front surface of a shock absorber of a vehicle bumper to form an electromagnetic field by an application of alternating current power and a conductive material disposed at a position facing the conductive pattern on an inner surface of a bumper skin of the vehicle bumper.

An embodiment of the present invention may further include a step of operating the protection module driving unit when the colliding object is a pedestrian.

An embodiment of the present invention may further include a step in which the control unit determines whether the front object is the protection device operation target based on the detection result of the front object detection unit including the infrared thermal imaging camera; and a step in which the control unit operates the protection module driving unit when the control unit determines the front object to be the protection device operation target and the colliding object is a pedestrian.

The step of determining the protection device operation target may include a step in which the control unit compares the integral value obtained by integrating the infrared intensity of the front object inputted from the infrared thermal imaging camera and compensated for the outside temperature and identifies the pedestrian target; and a step in which the control unit determines the pedestrian target to be the protection device operation target when the control unit identifies the pedestrian target and the integral value is equal to or higher than the set intensity.

According to the pedestrian collision determination system and method, the conductive pattern and conductive material that may be simply attached with a double-sided adhesive tape or printed are employed as a means of detecting the pedestrian collision so that the man-hour for installing a plurality of individual sensor structures on the bumper may be significantly reduced, and no sensor itself and no additional structure for mounting the sensor are required so that the cost may be significantly reduced.

The effects that may be obtained from the present invention are not limited to the effects mentioned above, and other effects not mentioned will be clearly understood by those skilled in the art that the present invention pertains to from the following description.

DETAILED DESCRIPTION OF THE INVENTION

A pedestrian collision determination system according to various embodiments will be described in detail with reference to the accompanying drawings in the following.

Figure 1:
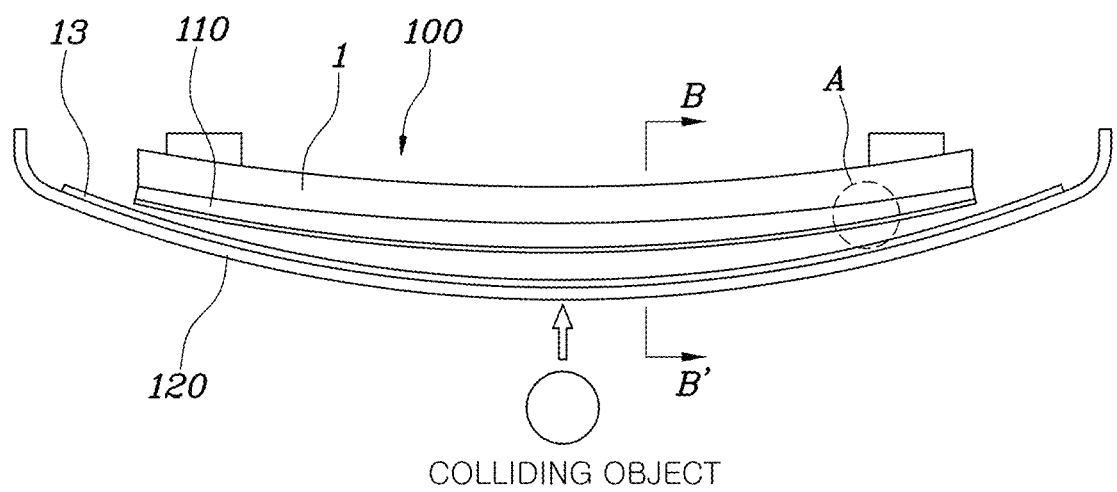
FIG. 1 is a view showing an installation example of a collision detection sensor of a pedestrian collision determination system according to an embodiment of the present invention.
Figure 2:
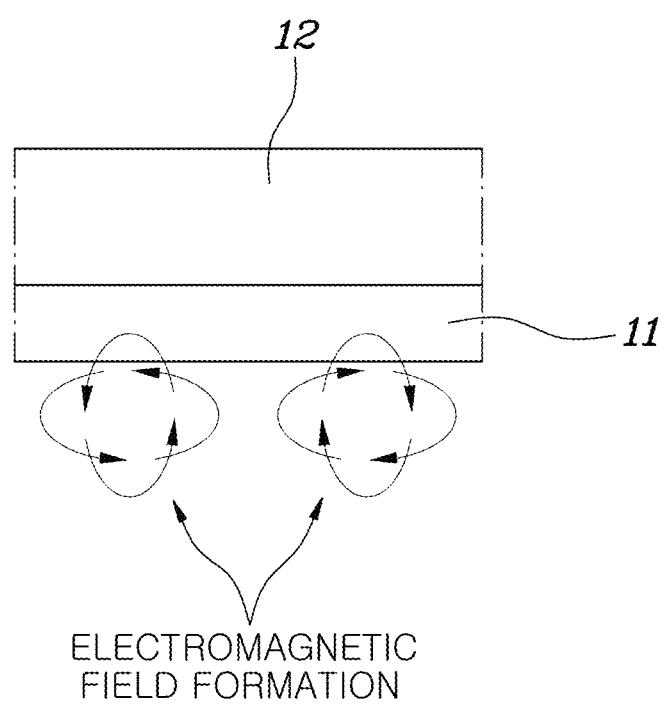
FIG. 2 is an enlarged view of area 'A' in FIG. 1.
Figure 3:
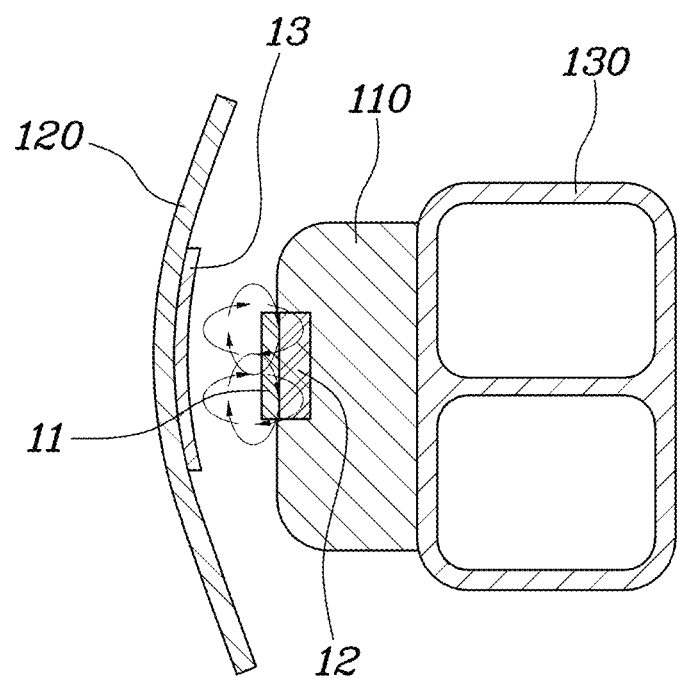
FIG. 3 is a view showing a cross-section taken along the line B-B' in FIG. 1.

FIG. 1 is a view showing an installation example of a collision detection sensor of a pedestrian collision determination system according to an embodiment of the present invention, FIG. 2 is an enlarged view of area 'A' in FIG. 1, and FIG. 3 is a view showing a cross-section taken along the line B-B' in FIG. 1.

FIGS. 1 to 3 show that a collision detection sensor employed in the pedestrian collision determination system according to an embodiment of the present invention may include a conductive pattern disposed on a front surface of a shock absorber 110 of a vehicle bumper 100 to form an electromagnetic field by the application of the alternating current power and a conductive material 13 disposed at a position facing the conductive pattern 11 on an inner surface of a bumper skin 120 of the vehicle bumper 100.

The bumper 100 of the vehicle may include the bumper skin 120, the shock absorber 110, and a bumper back beam 130. The bumper skin 120 is a portion which is exposed to the outside of the vehicle and to which a shock is applied, the shock absorber 110 is a portion disposed at the rear of the bumper skin 120 to absorb the shock applied to the bumper skin, and the bumper back beam 130 may be made of a highly rigid material to serve to disperse the shock applied to the bumper skin 120 and transmitted to a vehicle body.

Since the structure of the bumper 100 is already known in the art and the more specific structure of the bumper 100 is not directly related to the present invention, a more detailed description of the structure of the bumper 100 will be omitted.

The conductive pattern 11 may be disposed on the front surface of the shock absorber 110 and may form an electromagnetic field around it by the application of an alternating current. In particular, the conductive pattern 11 may have a pattern corresponding to a radiator of an antenna.

More specifically, the conductive pattern 11 may be implemented as a metal (e.g., gold, silver, copper, etc.) pattern printed on a dielectric film 12 and form a time-varying electromagnetic field around it by the application of alternating current power of a constant frequency. That is, the conductive pattern 11 is similar to the radiation pattern of the antenna that forms an electromagnetic wave through the formation of an electromagnetic field so that various types of antenna radiation patterns known in the art may be employed to implement the conductive pattern 11.

The dielectric film 12 printed with the conductive pattern 11 may be attached to the surface of the shock absorber 110 using a conventional adhesive means such as a double-sided adhesive tape.

The conductive pattern 11 may have a band shape extending in the horizontal direction of the vehicle and extend from one end of the surface of the shock absorber 110 to the other end. Another example is the conductive pattern 11 that has a band shape extending in the horizontal direction of the vehicle and may be implemented as a plurality of patterns separated from each other at appropriate positions (e.g., three places at the center, right, and left) of the shock absorber 110. In this case, the alternating current power may be applied to each of the plurality of conductive patterns 11 and the current flowing through each may be detected.

The conductive material 13 may be disposed on an inner surface of the bumper skin 120 disposed on the front surface of the shock absorber 110, that is, at a position facing the conductive pattern 11 disposed on the shock absorber 110. The conductive material 13 may be manufactured by coating or printing a metal material (e.g., gold, silver, copper) on the inner surface of the bumper skin 120.

Figure 4:
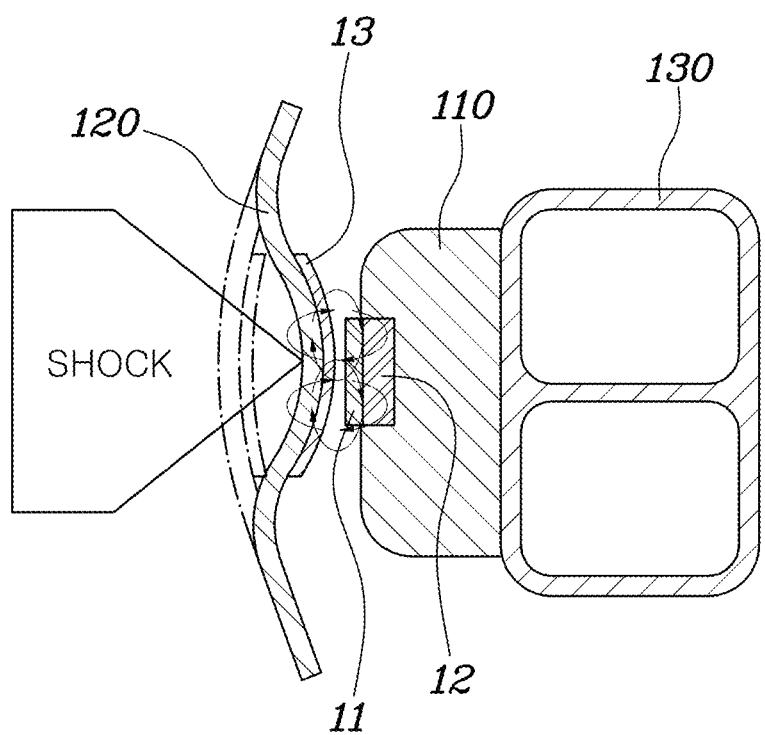
FIG. 4 is a cross-sectional view showing an example of bumper deformation when an external shock is applied in a pedestrian collision determination system according to an embodiment of the present invention.

FIG. 4 is a cross-sectional view showing an example of bumper deformation when an external shock is applied in a pedestrian collision determination system according to an embodiment of the present invention.

As shown in FIG. 4, when an external shock is applied, the conductive material 13 positioned on the inner surface of the bumper skin 120 approaches the conductive pattern 11 and changes the electromagnetic fields formed by the conductive pattern 11, which may change the size of the current flowing through the conductive pattern 11. More specifically, the size of the current flowing through the conductive pattern before the shock may be determined by impedance characteristics of the current itself. When a bumper skin 120 deformation generated by a collision causes the conductive material 13 disposed on the bumper skin 120 to penetrate a region of an electromagnetic field formed by the conductive pattern 11, capacitance and resistance are formed between the conductive pattern 11 and the conductive material 13 to change the impedance characteristic so that the current flowing through the conductive pattern changes.

Figure 5:
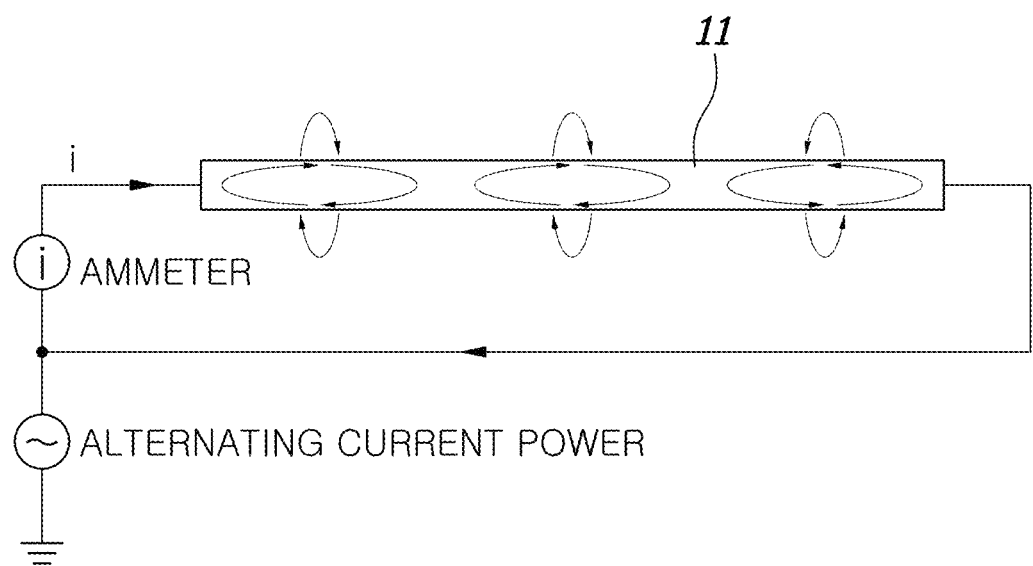
FIG. 5 is a view showing a state of a conductive pattern before a collision occurs in a pedestrian collision determination system according to an embodiment of the present invention.
Figure 6:
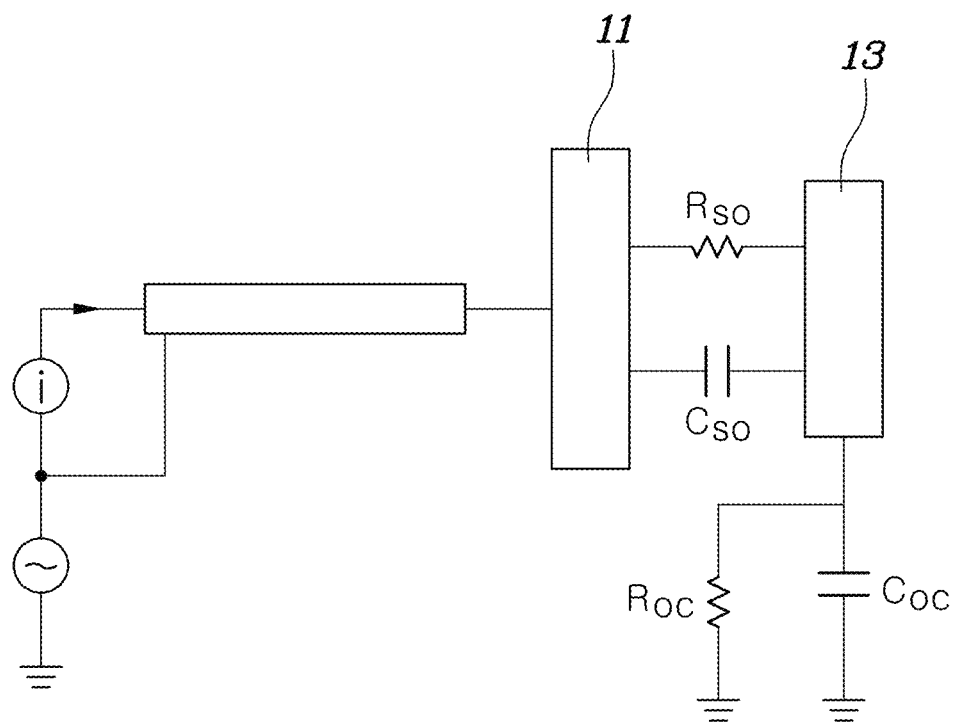
FIG. 6 is a view showing a state between a conductive pattern and a conductive material after a collision occurs in a pedestrian collision determination system according to an embodiment of the present invention.

FIG. 5 is a view showing a state of a conductive pattern before a collision occurs in a pedestrian collision determination system according to an embodiment of the present invention, and FIG. 6 is a view showing a state between a conductive pattern and a conductive material after a collision occurs in a pedestrian collision determination system according to an embodiment of the present invention.

As shown in FIG. 5, when constant alternating current power is applied to the conductive pattern 11, a time-varying magnetic field with a constant peak value and time-varying electric field are generated in the conductive pattern before the collision occurs. At this time, the current flowing through the conductive pattern 11 may be an alternating current with the constant peak value.

When a deformation of the bumper skin 120 is generated by the collision, as shown in FIG. 6, the conductive material 13 disposed on the bumper skin 120 penetrates into the region of the electromagnetic field of the conductive pattern 11, capacitance Cso and resistance are formed between the conductive pattern 11 and the conductive material 13 to change the impedance characteristic.

Here, the conductive pattern 11 and the conductive material 13 remain spatially separated before and after the collision so that size of the resistance between the conductive pattern 11 and the conductive material 13 remains the same before and after the collision. Accordingly, practically no impedance change of the conductive pattern caused by a resistance change exists at the time of a collision, and only a capacitance change may be considered in an impedance change caused by the collision.

The impedance is proportional to the size of resistance and inversely proportional to the size of capacitance so that the size of the current flowing through the conductive pattern 11 increases when capacitance is generated between the conductive pattern 11 and the conductive material 13 at the time of the collision.

On the other hand, the characteristic of the constant elasticity of the bumper skin 120 generates the constant vibration at the time of a collision with a pedestrian or other object. This vibration causes the size of the capacitance between the conductive pattern 11 and the conductive material 13 to also vibrate, and accordingly, the peak value of the current flowing through the conductive pattern 11 also vibrates.

It is known in the art that the penetration displacement of the bumper skin with respect to an object collision is proportional to the collision speed and the mass of the colliding object and that the vibration frequency of the bumper skin generated at the time of the collision is proportional to the square root of the stiffness of the colliding object.

Using such characteristics, the pedestrian collision determination system according to an embodiment of the present invention may determine whether the colliding object is a pedestrian using the magnitude of the peak value and the vibration frequency of the peak value of the current flowing in the conductive pattern 11.

As described above, the pedestrian collision determination system according to various embodiments of the present invention employs the conductive pattern 11 and the conductive material 13 as a means of detecting the pedestrian collision so that the man-hour for installing individual sensor structures on a plurality of bumpers may be significantly reduced, and the sensor itself and additional structures for installing the sensor are not required so that the costs may be significantly reduced.

Figure 7:
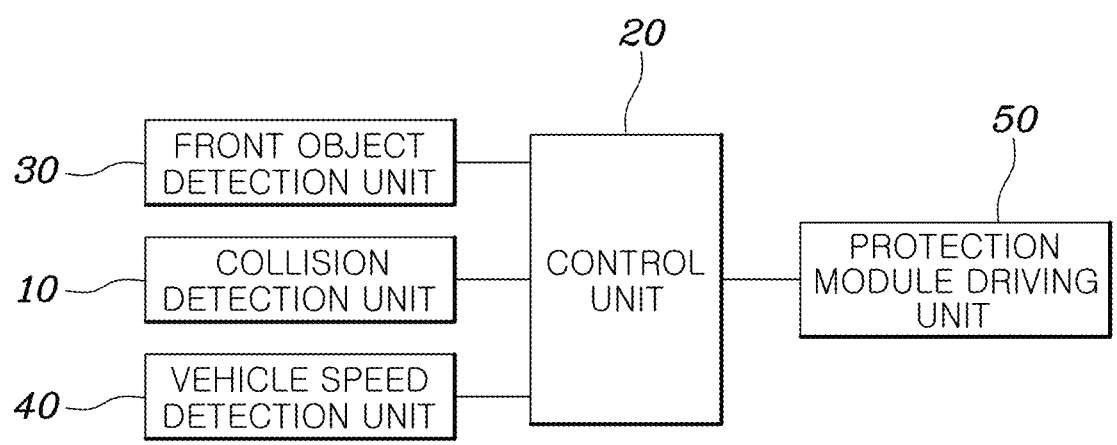
FIG. 7 is a block diagram of a pedestrian collision determination system according to an embodiment of the present invention.

FIG. 7 is a block diagram of a pedestrian collision determination system according to an embodiment of the present invention.

FIG. 7 shows that the pedestrian collision determination system according to an embodiment of the present invention may be configured to include the collision detection sensor 10 and the control unit 20, which may include one or more processors and/or other circuits configured to execute the processes described herein, as described with reference to FIGS. 1 to 6.

The control unit 20 may determine the mass and the stiffness of the colliding object based on the magnitude of the peak value and the vibration frequency of the peak value of the current flowing in the conductive pattern 11 and, based on the determination result, may determine whether the colliding object is a pedestrian.

As described above, the penetration displacement of the bumper skin of the colliding object is known to be proportional to the colliding speed and the mass of the colliding object so that the control unit 20 may deduce the mass of the colliding object using the maximum value of the peak value of the current flowing in the conductive pattern 11 corresponding to the penetration displacement of the bumper skin and the vehicle speed detected by a vehicle speed detection unit 40 at the time of the collision.

In addition, the square root of the stiffness of the colliding object is known to be proportional to the vibration frequency of the bumper skin so that the stiffness of the colliding object may be deduced from the vibration frequency of the peak value of the current flowing in the conductive pattern 11.

Figure 8:
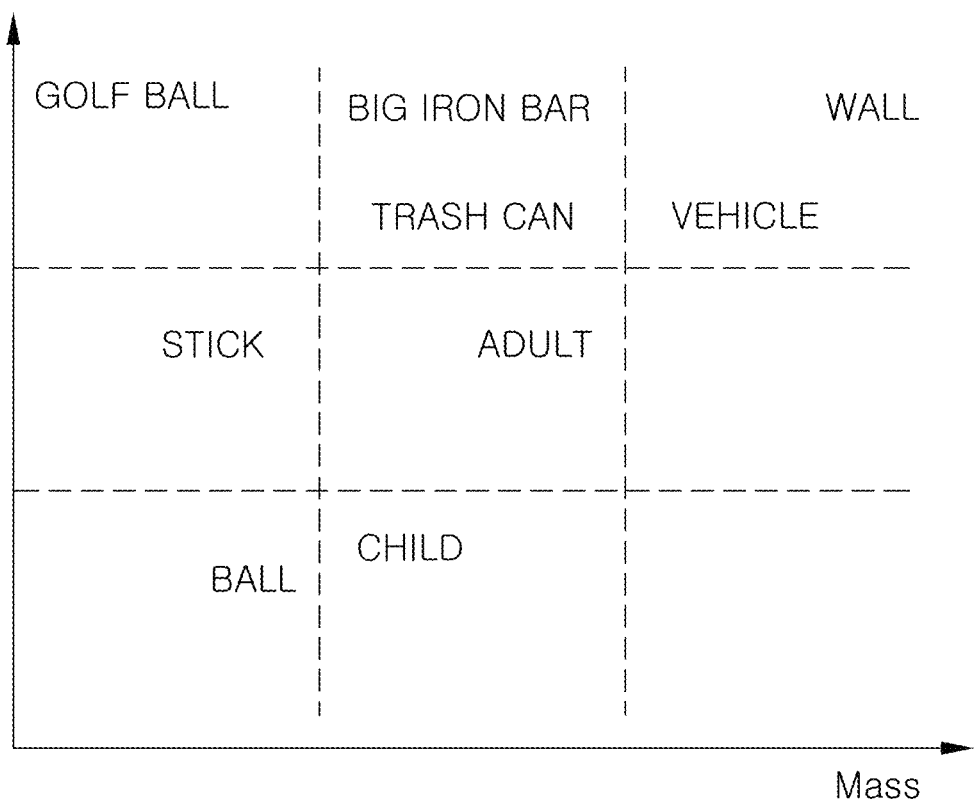
FIG. 8 is a view showing the types of collision target according to stiffness and mass in a pedestrian collision determination system according to an embodiment of the present invention.

FIG. 8 is a view showing the types of collision target according to stiffness and mass in a pedestrian collision determination system according to an embodiment of the present invention.

The control unit 20 may determine the type of the colliding object by applying the criteria shown in FIG. 8 to the deduced mass and stiffness of the colliding object, and when the colliding object is determined to be a pedestrian, may operate a protection module driving unit 50 comprising at least one circuit configured to operate a pedestrian protection module such as a hood lift or a pedestrian airbag.

The pedestrian collision determination system according to an embodiment of the present invention may further include a front object detection unit 30 as an auxiliary means of pedestrian collision determination, and may still further include the protection module driving unit 50 for driving the pedestrian protection module based on the result of the collision determination.

The front object detection unit 30 is a sensor detecting a front object of the vehicle and may include a far infrared FIR thermal imaging camera. The front object detection unit 30 may detect infrared rays emitted from the front object and provide the same to the control unit 20.

The protection module driving unit 50 may drive a protection module for protecting the pedestrian at the time of a collision with a vehicle. Here, the protection module may include at least either of a hood lift and a pedestrian airbag.

The control unit 20 may determine the front object to be the protection device operation target when the integral value obtained by integrating the infrared intensity of the front object inputted from the FIR thermal imaging camera which is the front object detection unit 30 and compensated for the outside temperature is equal to or higher than a set intensity. At this time, after separating an animate object from an inanimate object first, the control unit 20 may differentiate between a child and an adult among the animate objects next.

However, the protection device operation target of the present invention is an adult pedestrian, of whom the intensity of the infrared ray is higher than an inanimate object and a child so that the control unit 20 may determine the front object to be a protection device operation target when the integral value obtained by integrating the intensity of the infrared ray emitted from the front object is equal to or higher than the set intensity for differentiating an adult pedestrian.

Figure 11:
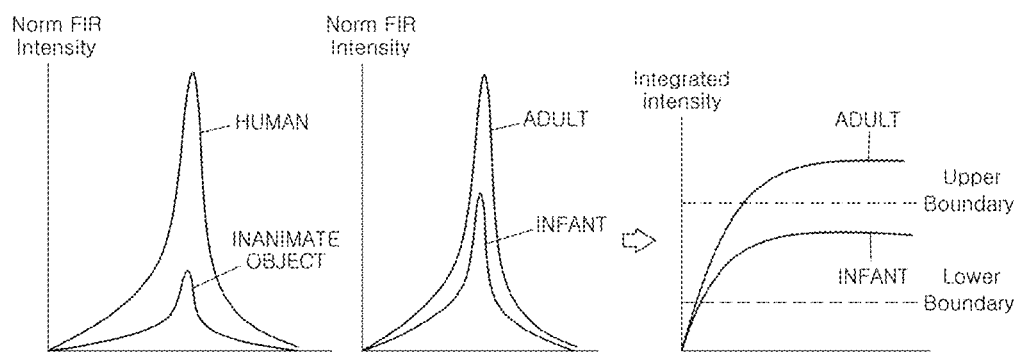
FIG. 11 is a graph showing by way of an example an output of an infrared thermal imaging camera of a pedestrian collision determination system according to an embodiment of the present invention.

FIG. 11 is a graph showing by way of an example an output of an infrared thermal imaging camera of a pedestrian collision determination system according to an embodiment of the present invention.

As shown in the left graph in FIG. 11, the human body has a higher infrared intensity than other surrounding objects (inanimate objects). In addition, as shown in the center graph in FIG. 11, the infrared intensities are different for an adult and a child. Of course, an adult of higher height and larger figure emits higher infrared intensity than a child.

In consideration of this, as shown in the right graph in FIG. 11, the control unit 20 integrates the infrared intensity obtained from the outside front target before the collision, compensates the same for the temperature outside the vehicle, compares the integral value of the infrared intensity with the set reference value, and then, may determine before the collision whether the predicted colliding object is a target of the collision protection device driving when the integral value is larger than the reference value.

Here, the reference value may be set to any value optimized through repeated experiments or simulations.

On the other hand, after determining whether the front object is the protection device operation target, the control unit 20 determines whether the collision is the protection device operation collision when the front object is determined to be the protection device operation target and may operate the protection module driving unit 50 when the collision is determined to be the protection device operation collision. That is, after determining the protection device operation target first and sequentially determining the protection device operation collision next, the control unit 20 may operate the protection module driving unit 50.

As described above, the pedestrian collision determination system according to various embodiments of the present invention identifies a pedestrian in the front through an active sensor such as the FIR thermal image camera 30, determines whether the pedestrian is a protection device operation target, and when a collision occurs, determines whether the collision is the protection device operation collision through a passive sensor consisting of the conductive pattern 11 and the conductive material 13 so that the protection module is only driven in the case of the collision with the protection device operation target, thereby preventing the protection device from malfunctioning and reducing the costs caused by the malfunction.

Figure 9:
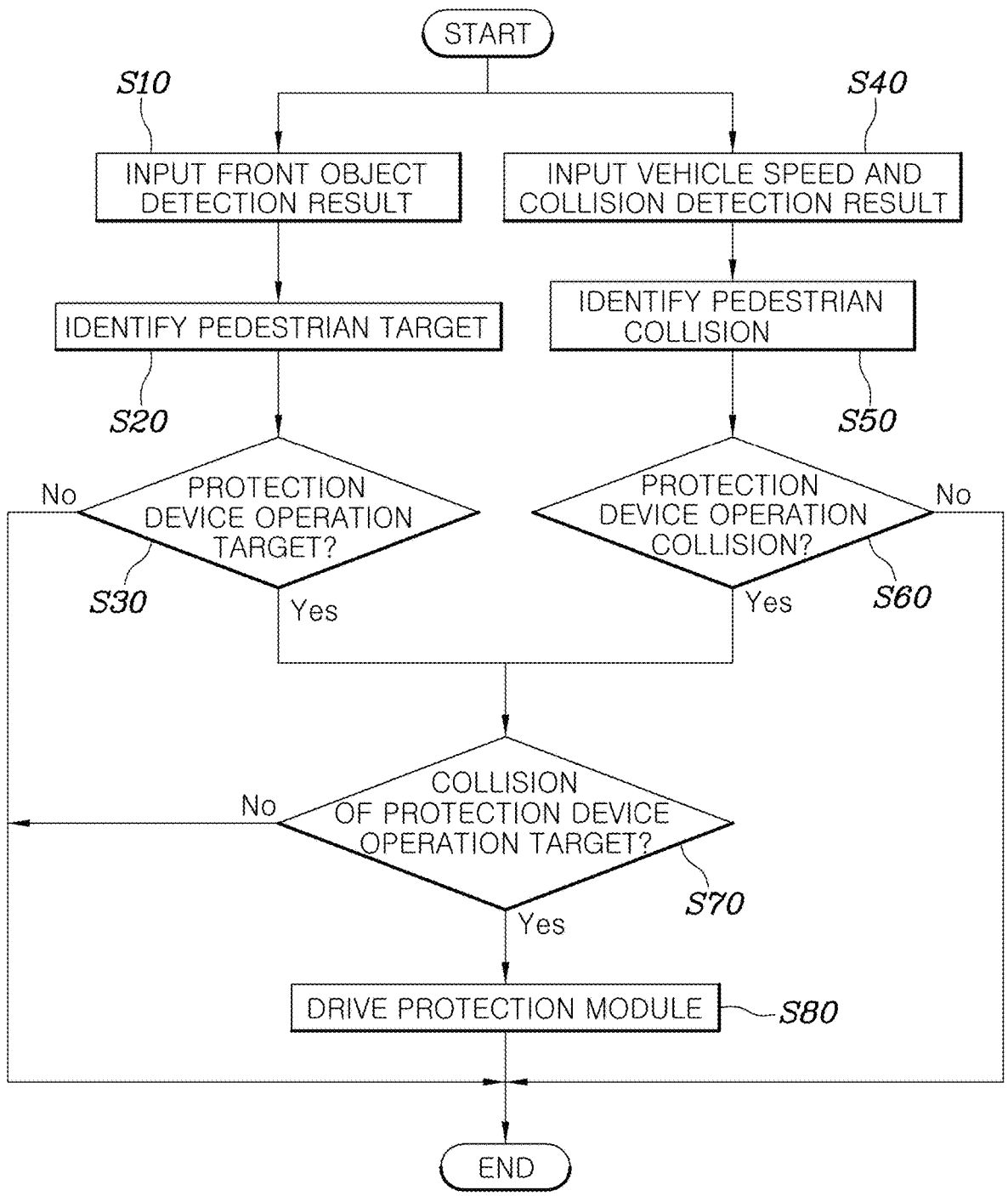
FIG. 9 is a flowchart for describing a pedestrian collision determination method according to an embodiment of the present invention.

FIG. 9 is a flowchart for describing a pedestrian collision determination method according to an embodiment of the present invention.

As shown in FIG. 9, in a pedestrian collision determination method according to an embodiment of the present invention, the control unit 20 receives a detection result from the FIR thermal imaging camera which is the front object detection unit 30 (S10).

Next, after receiving an input of the detection result from the FIR thermal imaging camera in the step S10, the control unit 20 may identify the pedestrian target (S20).

In the step S20, the control unit 20 compares the integral value obtained by integrating the infrared intensity of the front object inputted and compensated for the outside temperature with the set intensity and identifies the pedestrian target. In the present embodiment, the pedestrian target is an adult pedestrian, whose infrared intensity is higher than the infrared intensity of an inanimate object and a child, so the control unit 20 may compare the integral value obtained by integrating the infrared intensity emitted from the front object with the set intensity for identifying an adult pedestrian and identify the pedestrian target.

Next, the control unit 20 may determine whether the pedestrian target is the protection device operation target based on the identification result of the pedestrian target in the step S20 (S30). When the pedestrian target is identified as an adult, the control unit 20 may determine the pedestrian target to be the protection device operation target.

On the other hand, the control unit 20 executes the process of determining the protection device operation target and receives the vehicle speed and the collision detection result from the vehicle speed detection unit 40 and collision detection sensor 10 concurrently (S40).

Next, after receiving an input of the collision detection result from the collision detection sensor 10 in the step of S40, the control unit 20 may identify the pedestrian collision based on the current change amount and the current amount change pattern, which are the collision detection results (S50).

Here, the control unit 20 deduces the mass of the colliding object based on the maximum value of the peak value of the current flowing in the conductive pattern 11 of the collision detection sensor 10 and the vehicle speed detected by the vehicle speed detection unit 40 and calculates the stiffness of the colliding object based on the vibration frequency of the peak value of the current flowing in the conductive pattern 11, and then, may determine whether the colliding object is a pedestrian (adult) based on the result.

That is, after calculating the mass and the stiffness of the colliding object based on the magnitude and the vibration frequency of the peak value of the current flowing in the conductive pattern 11 and the vehicle speed, the control unit 20 may identify the colliding object as an adult pedestrian when the stiffness of the colliding object is included in the set range and the mass is equal to or greater than a set value as shown in FIG. 8.

Next, the control unit 20 may determine whether the collision is a protection device operation collision based on the result of identifying the pedestrian collision in the step S50 (S60).

Next, when it is determined in the step S60 that the pedestrian collision involves an adult pedestrian, the control unit 20 may determine the collision to be the protection device operation collision.

Next, according to the determination result of the protection device operation target in the step S30 and the determination result of the protection device operation collision in the step S60, the control unit 20 may determine the collision to be the protection device operation target (S70).

Next, when it is determined in the step S70 that the colliding object is the protection device operation target and that the collision is the protection device operation collision, the control unit 20 may operate the protection module driving unit 50 (S80).

Figure 10:
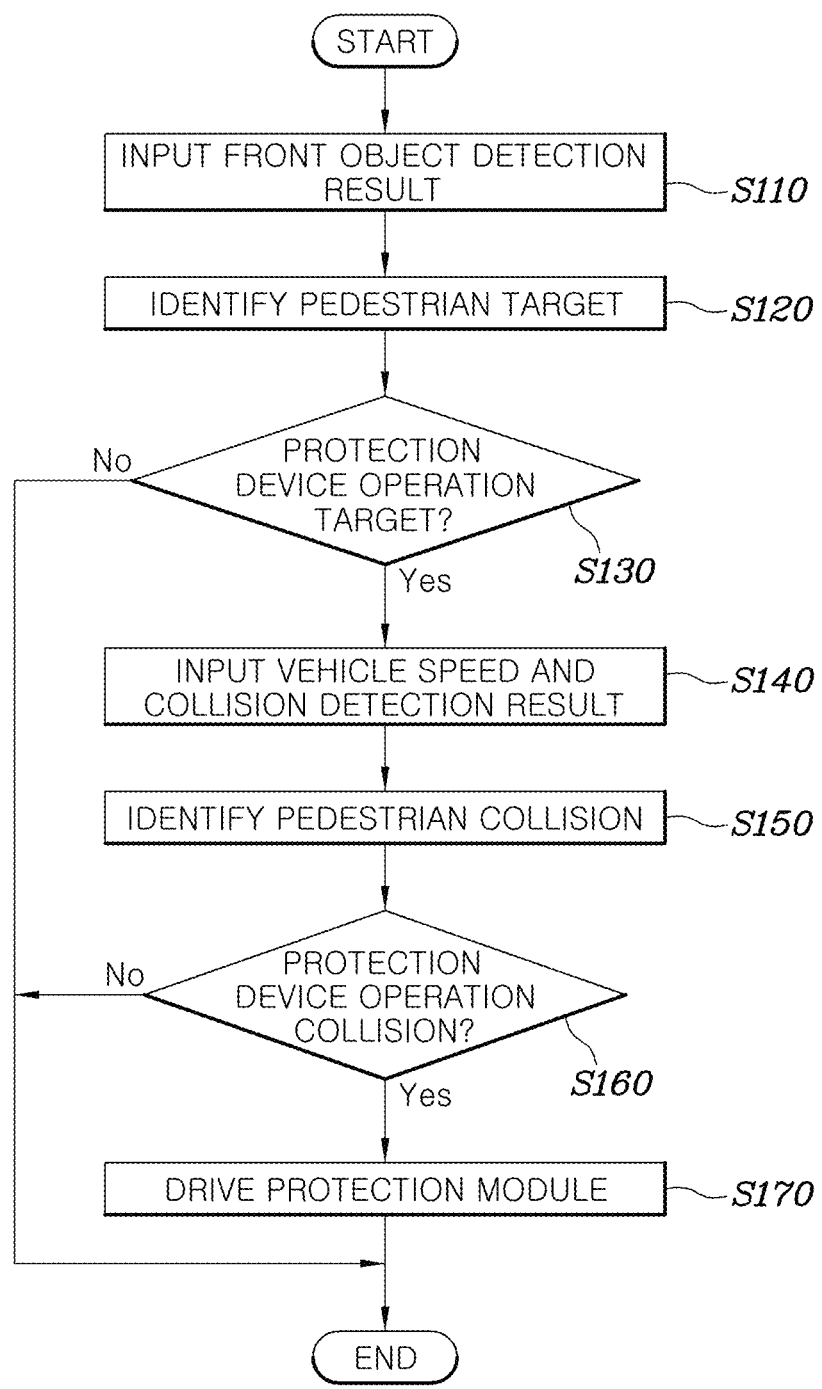
FIG. 10 is a flowchart for describing a pedestrian collision determination method according to an embodiment of the present invention.

FIG. 10 is a flowchart for describing a pedestrian collision determination method according to an embodiment of the present invention.

As shown in FIG. 10, in the pedestrian collision determination method according to an embodiment of the present invention, the control unit 20 may first receive an input of the detection result from the FIR thermal imaging camera which is the front object determination unit 30 (S110).

Next, after receiving an input of the detection result from the FIR thermal imaging camera in the step S110, the control unit may identify the pedestrian target (S120). The control unit 20 compares the integral value obtained by integrating the infrared intensity of the front object inputted and compensated for the outside temperature and may identify the pedestrian target in the step S120.

In an embodiment of the present invention, the pedestrian target is an adult pedestrian, and the infrared intensity of the adult pedestrian is higher than the infrared intensity of the inanimate object and child so that the control unit 20 may compare the integral value obtained by integrating the infrared intensity emitted from the front object with the set intensity for identifying an adult pedestrian and identify the pedestrian target.

Next, the control unit 20 may determine whether the colliding object is the protection device operation target based on the identification result of the pedestrian target in the step S120 (S130). When the pedestrian target is identified as an adult in the step S130, the control unit 20 may determine the pedestrian target to be the protection device operation target.

Next, when the pedestrian target is determined to be the protection device operation target in the step S130, the control unit 20 may receive an input of the vehicle speed and the current change of the conductive pattern 11, which corresponds to the collision detection result, from the vehicle speed detection unit 40 and the collision detection sensor 10 (S140).

Next, after receiving the input of the collision detection result from the collision detection sensor 10 in the step S140, the control unit 20 may identify the pedestrian collision based on the current change amount and the current amount change pattern which are the collision detection results (S150).

Here, after calculating the mass of the collision object based on the maximum value of the peak value of the current flowing in the conductive pattern 11 of the collision detection sensor 10 and the vehicle speed detected by the vehicle speed detection unit 40 and calculating the stiffness of the collision object based on the vibration frequency of the peak value of the current flowing in the conductive pattern 11, the control unit 20 may determine whether the collision object is a pedestrian (adult) based on the determination results.

That is, after calculating the mass and the stiffness of the colliding object based on the magnitude and the vibration frequency of the peak value of the current flowing in the conductive pattern 11 and the vehicle speed, as shown in FIG. 8, the control unit 20 may identify the colliding object as an adult pedestrian when the stiffness of the colliding object is included in the set range and the mass is equal to or greater than a set value.

Next, based on the identification result the pedestrian collision in the step S150, the control unit 20 may determine whether the pedestrian collision involves the protection device operation target (S160).

Next, when it is determined in the step S160 that the pedestrian collision involves an adult pedestrian, the control unit 20 may determine the collision to involve the protection device operation target.

Next, when the pedestrian collision is determined to be the protection device operation collision in the step S160, the control unit 20 operates the protection module driving unit 50 (S170).

As described above, according to the pedestrian determination method according to an embodiment of the present invention, the front pedestrian is identified through the active sensor, whether the pedestrian is the protection device operation target is determined, and when the vehicle collision is detected through the passive sensor, whether the collision is the protection device operation collision is determined so that the protection module is only driven in the case of the protection device operation target, thereby preventing the protection device from malfunctioning and reducing the cost caused by the malfunctioning.

Specific embodiments of the present invention are illustrated and described above, but it will be self-evident to those skilled in the art that the present invention may be improved upon and modified in various ways within the scope not departing from the technical spirit of the present invention provided by the patent claims below.

DESCRIPTION OF REFERENCE NUMERALS

10: collision detection sensor
11: conductive pattern

12: dielectric film
13: conductive material
20: control unit
30: front object detection unit
40: vehicle speed detection unit
100: bumper
110: shock absorber
120: bumper skin
130: bumper back beam

What is claimed is:

1. A pedestrian collision determination system comprising:
   a collision detection sensor system including:
   a conductive pattern disposed on a front surface of a shock absorber of a vehicle bumper, the conductive pattern being configured to form an electromagnetic field by an application of alternating current power, and
   a conductive material disposed at a position facing the conductive pattern on an inner surface of a bumper skin of the vehicle bumper; and
   a control unit comprising at least one circuit configured to determine an occurrence or non-occurrence of a pedestrian collision based on a change of a current flowing in the conductive pattern, wherein the at least one circuit of the control unit is configured to calculate a mass and a stiffness of a colliding object based on the magnitude of the peak value of the current flowing in the conductive pattern and the vibration frequency of the peak value and, based on the determination result, determine whether the colliding object is a pedestrian by comparing the calculated stiffness with a set range indicative of a pedestrian stiffness comprising a maximum stiffness value and a minimum stiffness value and the calculated mass with a pre-defined value.

2. The pedestrian collision determination system of claim 1, wherein the conductive pattern has an antenna radiation pattern.

3. The pedestrian collision determination system of claim 1, wherein the current flowing in the conductive pattern changes when a bumper skin deformation generated by a pedestrian collision causes the conductive material to penetrate a region of an electromagnetic field formed by the conductive pattern.

4. The pedestrian collision determination system of claim 1, wherein the peak value of the current flowing in the conductive pattern vibrates according to the frequency of the bumper skin vibration generated by the pedestrian collision.

5. The pedestrian collision determination system of claim 1 further comprising a front object detection unit including at least one sensor configured to detect an object in front of the vehicle and a protection module driving unit including at least one circuit configured to drive a protection module for protecting a pedestrian at the time of the collision with the vehicle.

6. The pedestrian collision determination system of claim 5, wherein the protection module comprises at least one of a hood lift and a pedestrian airbag.

7. The pedestrian collision determination system of claim 5, wherein the at least one sensor of the front object detection unit includes an infrared thermal imaging camera, and the at least one circuit of the control unit is configured to determine the front object to be a protection device operation target in response to an integral value obtained by integrating the infrared intensity of the front object inputted from the infrared thermal imaging camera and compensated for the outside temperature being equal to or higher than a set intensity.

8. The pedestrian collision determination system of claim 1 further comprising an infrared thermal imaging camera configured to capture the front object, wherein the at least one circuit of the control unit is configured to determine whether the front object is the pedestrian protection device operation target based on the information inputted from the infrared thermal imaging camera before the collision and further determine whether the front object is the pedestrian protection device operation target based on the detection current flowing in the conductive pattern at the time of the collision with the front object.

9. A pedestrian collision determination method comprising:
   forming an electromagnetic field by applying alternating current power to a conductive pattern of a collision detection sensor, the conductive pattern being disposed on a front surface of a shock absorber of a vehicle bumper, and the collision detection sensor further including a conductive material disposed at a position facing the conductive pattern on an inner surface of a bumper skin of the vehicle bumper;
   determining the size and stiffness of a colliding object based on a magnitude of a peak value of the current flowing in the conductive pattern and a vibration frequency of the peak value of the current; and
   based on the determination result, determining whether the colliding object is a pedestrian by comparing the calculated stiffness with a set range indicative of a pedestrian stiffness comprising a maximum stiffness value and a minimum stiffness value and the calculated mass with a pre-defined value.

10. The pedestrian collision determination method of claim 9 further comprising driving a protection module for protecting the pedestrian when the colliding object is the pedestrian.

11. The pedestrian collision determination method of claim 9, wherein driving the protection module comprises operating a protection module driving unit including a circuit coupled to the protection module and configured to drive the protection module.

12. The pedestrian collision determination method of claim 9, wherein driving the protection module comprises driving at least one of a hood lift and a pedestrian airbag.

13. The pedestrian collision determination method of claim 9 further comprising:
   obtaining a detection result of a front object detection unit including an infrared thermal imaging camera;
   determining whether the front object is a protection device operation target based on the detection result; and
   operating the protection module driving unit in response to determining the front object is the protection device operation target and the colliding object is a pedestrian.

14. The pedestrian collision determination method of claim 13, wherein the determining whether the front object is the protection device operation target is based on the detection result of the front object detection unit including an infrared intensity of an image captured by the infrared thermal imaging camera.

15. The pedestrian collision determination method of claim 13, wherein the determining whether the front object is the protection device operation target includes:
   comparing an integral value obtained by integrating an infrared intensity of detection result of the front object inputted from the infrared thermal imaging camera and compensated for the outside temperature and identifying the pedestrian target; and determining that the front object is the protection device operation target in response to identifying the pedestrian target and the integral value being equal to or higher than the set intensity.

* * * * *